United States Patent [19]

Bedzyk

[11] Patent Number: 5,194,993
[45] Date of Patent: Mar. 16, 1993

[54] ADJUSTABLE MOUNT FOR CYLINDRICAL LENS

[75] Inventor: Mark Bedzyk, Rochester, N.Y.

[73] Assignee: Eastman Kodak Company, Rochester, N.Y.

[21] Appl. No.: 765,161

[22] Filed: Sep. 24, 1991

[51] Int. Cl.[5] .................................. G02B 7/02
[52] U.S. Cl. .............................. 359/813; 359/819
[58] Field of Search ............ 359/813, 819, 820, 830, 359/808, 809, 827

[56] References Cited

U.S. PATENT DOCUMENTS

| | | | |
|---|---|---|---|
| 3,204,471 | 9/1965 | Rempel | 74/89 |
| 3,359,849 | 12/1967 | Friedman | 359/813 |
| 3,596,863 | 8/1971 | Kaspareck | 248/278 |
| 3,722,990 | 3/1973 | Vondran | 359/813 |
| 3,989,358 | 11/1976 | Melmoth | 350/247 |
| 4,077,722 | 3/1978 | Bicskei | 356/127 |
| 4,099,852 | 7/1978 | Kobierecki et al. | 350/247 |
| 4,408,830 | 10/1983 | Wutherich | 350/247 |
| 4,437,730 | 3/1984 | Picket | 359/830 |
| 4,652,095 | 3/1987 | Mauro | 350/531 |
| 4,655,548 | 4/1987 | Jue | 350/245 |
| 4,769,803 | 9/1988 | Yamamiya | 359/813 |
| 4,796,962 | 1/1989 | Dejager et al. | 350/6.8 |
| 4,838,649 | 6/1989 | Ichikawa | 359/813 |
| 4,896,944 | 1/1990 | Irwin | 359/813 |
| 4,909,599 | 3/1990 | Hanke et al. | 350/252 |
| 4,921,320 | 5/1990 | Dejager et al. | 350/6.8 |
| 4,962,079 | 10/1990 | Owens et al. | 346/108 |
| 4,982,206 | 1/1991 | Kessler et al. | 346/108 |

FOREIGN PATENT DOCUMENTS

0177815 4/1986 European Pat. Off. ............ 359/813

Primary Examiner—Eugene R. LaRoche
Assistant Examiner—A. Zarabian
Attorney, Agent, or Firm—Warren Locke Franz

[57] ABSTRACT

A lens mount for positioning a cylindrical lens in x, y, z and $\theta_x$, $\theta_y$, $\theta_z$ directional degrees of freedom includes a carrier movable to a selected z axis position on a base including an elongated rail, and a non-precision retainer which applies a biasing torque in the $\theta_z$ direction onto the lens. The lens is positioned with a planar y-y surface against a corresponding planar x-y surface of a cavity of the carrier and is retained therein by the retainer for location in the magnification x or y axis and $\theta_z$ directions against the applied bias, with x axis and y axis directed locating screws contacting the lens and retainer. In a modified embodiment, relative z axis positioning, as well as independent magnification x or y and $\theta_z$ directional adjustment is provided in a mount that accommodates two cylindrical lenses.

14 Claims, 5 Drawing Sheets

FIG. 8

ADJUSTABLE MOUNT FOR CYLINDRICAL LENS

TECHNICAL FIELD

This invention relates generally to a device for adjustably mounting an optical element in an optical system; and, in particular, to an improved device for mounting a cylindrical lens, adjustably in rotational $\theta_z$ and translational x or y directions, in an optical system like that of a laser printer.

BACKGROUND ART

The positioning of a lens, mirror or similar optical element (hereafter "lens") involves spatially locating such element in six degrees of freedom. The lens is located translationally relative to each of three orthogonal axes directions generally designated as the x(scan), y(cross-scan), and z(beam path) axes directions. The lens is also located rotationally relative to three rotational directions, generally designated as the $\theta_x$, $\theta_y$ and $\theta_z$ directions, corresponding to angular rotation, respectively, about each of the x, y and z axes.

Monolithic spherical lenses having one curved surface provide power magnification in two orthogonal directions x and y, and focus parallel rays at a focal point corresponding to the center of curvature of the lens surface. Such lenses are used in laser printers, e.g., for controlling beam spot size, convergence and focusing. Correct positioning of such spherical lenses in the x, y translational and $\theta_x$, $\theta_y$ rotational directions assures alignment of the focal point and center of the lens relative to an incident beam of light coincident with the z axis. Correct location of the lens along the z-axis serves to assure proper focusing of an imaged object. Considerations for locating conjugate and composite spherical lens elements are similar.

Monolithic cylindrical lenses having one curved surface provide magnification in only one direction x or y and focus parallel rays to a line or lens cylinder axis parallel to the other direction y or x. Such lenses are used in laser printers, e.g., for beam shaping, such as for controlling x-direction or y-direction elliptical beam spot size. Cylindrical lenses may be manufactured to have a planar surface opposite the curved surface which is generally parallel to the x-y plane. Such a lens can, thus, be located in the $\theta_x$ and $\theta_y$ rotational directions by orienting the x-y planar surface normal to the incident beam z axis direction. Variations in positioning in the non-magnification direction (i.e. variations in the y direction for magnification in the x direction, and vice versa) are not critical. Thus, once correct orientation of the x-y planar surface is established, locational precision will be needed only in the x or y magnification translational and $\theta_z$ rotational directions. Location in the z direction is left adjustable for focusing purposes.

Traditional mounts for multiple degree of freedom positioning of optical elements nest multiple structural components for independent relative movement, one with respect to the other, to achieve the required translational and/or rotational positioning. U.S. Pat. No. 4,652,095, for example, describes an arrangement of three nested stages, each having a table shiftable along rails in a respective x, y or z translational direction by a threaded rod movable against the force of an opposing spring. The stages are nested, with the optical element mounted for movement with the table of the first stage, the first stage mounted for movement with the table of the second stage, and the second stage mounted for movement with the table of the third stage. U.S. Pat. No. 3,596,863 shows an arrangement of nested flexural pivots, each providing a respective $\theta x$, $\theta y$, or $\theta z$ rotational adjustment. Other examples of nested optical element mounting arrangements are given in U.S. Pat. Nos. 3,204,471; 4,077,722; 4,099,852; and 4,655,548.

Mounting arrangements that provide multiple degree of freedom lens positioning, without nesting, are shown in U.S. Pat. Nos. 3,989,358 and 4,408,830. The '358 patent provides independent x and y translational adjustments by micrometer spindles that are moved against knife-edges, displaced 90. circumferentially about a lens retaining ring. The '830 patent provides x, y and x-y translational adjustments by moving inclined faces of screw-driven cradle elements against corresponding angled corners of a rectangular lens retainer.

Conventional devices for achieving six-degree of freedom positioning of optical elements tend to be unduly complex and costly. Moreover, when used for mounting cylindrical lenses in optical systems like those of laser printers or the like, the precise machining utilized to ensure correct positioning in critical directions, is wasted when applied also for non-critical ones. In general, prior art mounts seek to avoid the exertion of any torque directly on the lens itself. See, e.g., U.S. Pat. No. 4,909,599.

DISCLOSURE OF THE INVENTION

It is an object of the invention to provide an improved inexpensive lens mount for positioning a cylindrical lens or similar optical element in six degrees of freedom, yet providing precise translational adjustment in the x or y axis magnification and z axis beam path directions, as well as precise rotational adjustment in the $\theta_z$ rotational direction.

It is another object of the invention to provide an inexpensive lens mount for the six degree of freedom positioning of a cylindrical lens, making maximum use of non-precision parts.

In accordance with the invention, a device is provided for positioning a cylindrical lens, or similar optical element, translationally with respect to x, y, z orthogonal axes directions and angularly relative to $\theta_x$, $\theta_y$, $\theta_z$ directions respectively rotationally about the x, y, z axes directions. The device includes means for translationally locating the lens in an x or y axis magnification direction; means for translationally locating the lens in the z axis beam-path direction; means for applying a biasing torque on the lens in the $\theta_z$ rotational direction; and means for rotationally locating the lens in the $\theta_z$ direction against the applied torque. Adjustment in the x or y magnification direction is advantageously provided by a push-pull mechanism wherein the lens is pushed in the magnification direction against the pull of an opposing restoring force.

In a preferred embodiment, described in greater detail below, $\theta_x$, $\theta_y$ positioning is achieved by abutting a planar surface, opposite a curved cylindrical surface, of the lens against a corresponding planar surface of an oversized cavity of a lens carrier. The cavity planar surface is oriented in the x-y vertical plane by other planar surfaces which contact a base rail and base by other planar surfaces formed on the carrier with x-z and y-z orientations that respectively contact horizontal and vertical planar surfaces of a railed base member. Positioning in the y or x axis non-magnification direction is achieved by other elements in the carrier cavity. Positioning in the x or y axis magnification direction is achieved by fitting planar edge surfaces of the lens in abutment with corresponding planar edge surfaces of a cavity of a lens retaining member, and utilizing a push-pull mechanism to shift the retainer in the magnification direction relative to the lens carrier. The same push-pull mechanism operates to bias the lens clockwise in the $\theta_z$ rotational direction about a pivot point provided in the carrier cavity. Rotational positioning in the $\theta_z$ direction is accomplished by moving a member into the carrier cavity into contact with the lens, to pivot the lens about the same pivot point in opposition to the biasing torque. Means for adjusting the lens in the z axis focus direction in the disclosed embodiment comprises a mechanism for locking the lens carrier in selected position along a rail directed in the z axis direction. Fasteners, threaded through aligned bores of the retainer and carrier, serve to lock the lens after making the x or y and $\theta_z$ adjustments. Those bores are elongated in the x or y magnification direction in the retainer to permit movement of the retainer in that direction relative to the carrier.

The lens mount of the invention provides a device for positioning a cylindrical lens in six degrees of freedom, in an inexpensive way, utilizing precise machining only where needed. The invention takes advantage of the particular characteristics of typical rectangularly configured cylindrical lenses, to provide precise positioning in all critical directions, with the minimum of nesting.

BRIEF DESCRIPTION OF THE DRAWINGS

Embodiments of the invention have been chosen for purposes of illustration and description, and are shown in the accompanying drawings, wherein.

Throughout the drawings, like elements are referred to by like numerals.

MODE OF CARRYING OUT THE INVENTION

Figure 1:
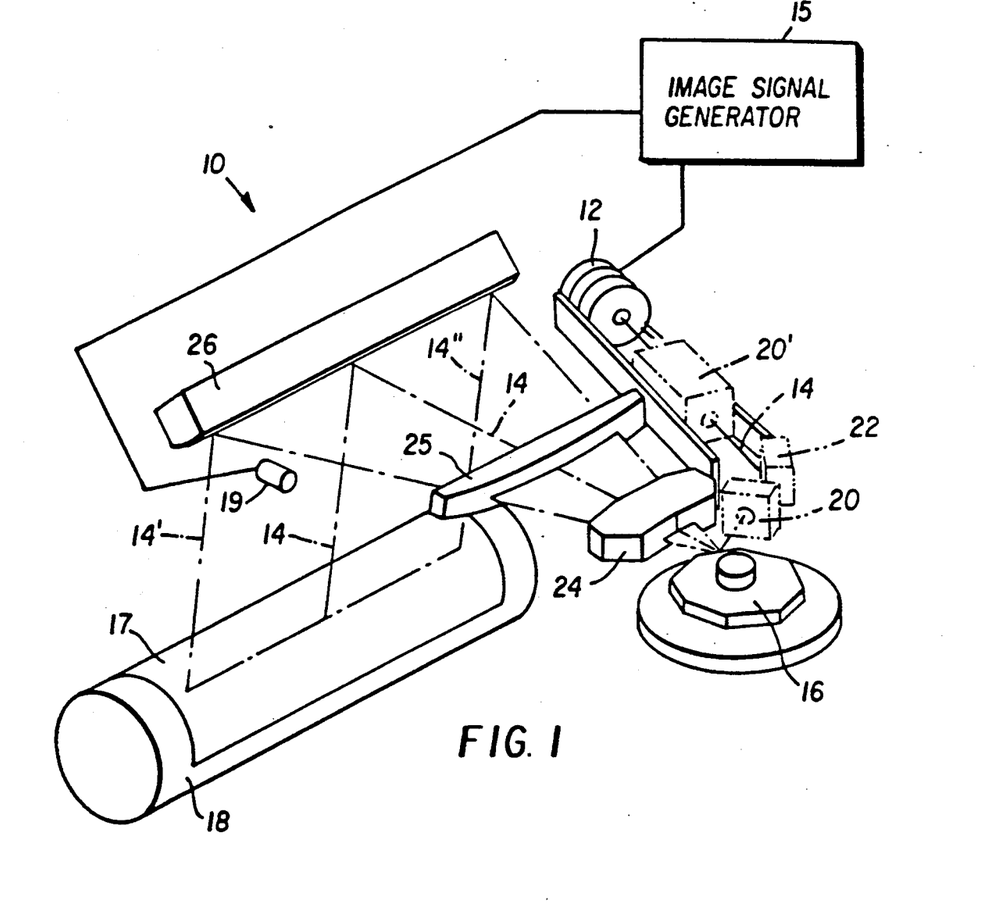
FIG. 1 is a schematic view of an optical system of a laser printer, employing cylindrical lens mounts in accordance with the invention.

The principles of the invention are illustrated with reference to exemplary implementations of devices suitable for positioning a cylindrical lens or the like optical element translationally with respect to x, y, z orthogonal axes directions and rotationally with respect to $\theta_x$, $\theta_y$, $\theta_z$ directions of an optical system, such as the optical system 10 of a laser printer, shown schematically in FIG. 1.

The optical system 10 includes an optical head 12 for projecting a beam of laser light along an optical beam path 14 (dot-dashed lines) coincident with a z axis direction. The beam 14 is modulated in accordance with information received from an image signal generating circuit 15, and scanned line-by-line in an x axis (scan) direction (from 14' to 14") by means of rotating polygon 16 onto a photosensitive film or other similar receiving medium 17. The medium 17 is in turn moved in a y axis (cross-scan) direction by means of a rotating drum 18. A start-of-scan detector 19 controls the timing of the light beam modulation. Optical elements, comprising cylindrical lenses positioned by lens mounts 20, 20' and a folding mirror 22 control beam shaping, focusing and direction between the optical head 12 and the mirrored multiple facets of the polygon 16. Optical elements, comprising lenses 24, 25 and mirror 26 located between polygon 16 and drum 18, correct for differences in beam focus due to the f-$\theta$ condition and focus the image in the cross-scan direction to avoid objectionable banding artifacts due to facet out-of-plane wobble and pyramid angle errors. Additional details concerning the functioning and operation of laser printers to which the present invention has application are given in U.S. application Ser. No. 637,429, entitled "Laser Printing," filed Jan. 1, 1991, and in U.S. Pat. Nos. 4,397,521; 4,796,962; 4,982,206; and 4,921,320.

The mount 20 (FIGS. 2-5) is suitable for application, for example, to locate a cylindrical lens 30 (shown in dot-dashed lines in FIG. 2) used for shaping the elliptical form of the scanning beam 14 in either the x or y axis direction and for trolling its $\theta_z$ angular orientation. A modified form 20' of mount 20, discussed further below, is suitable for performing the same function with respect to a plurality of cylindrical lenses 30', 30".

Figure 2:
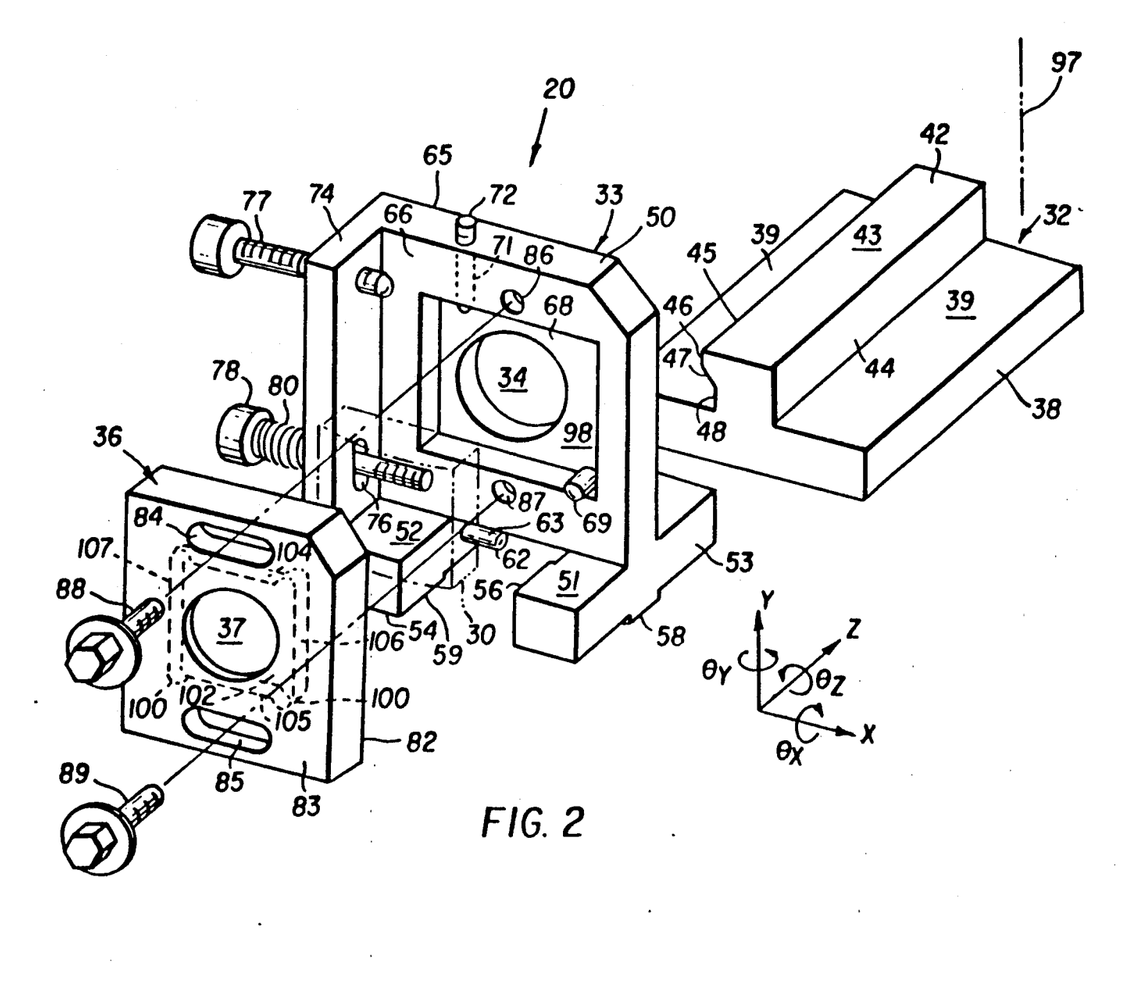
FIG. 2 is an exploded perspective view of a cylindrical lens mount of FIG. 1.
Figure 3:
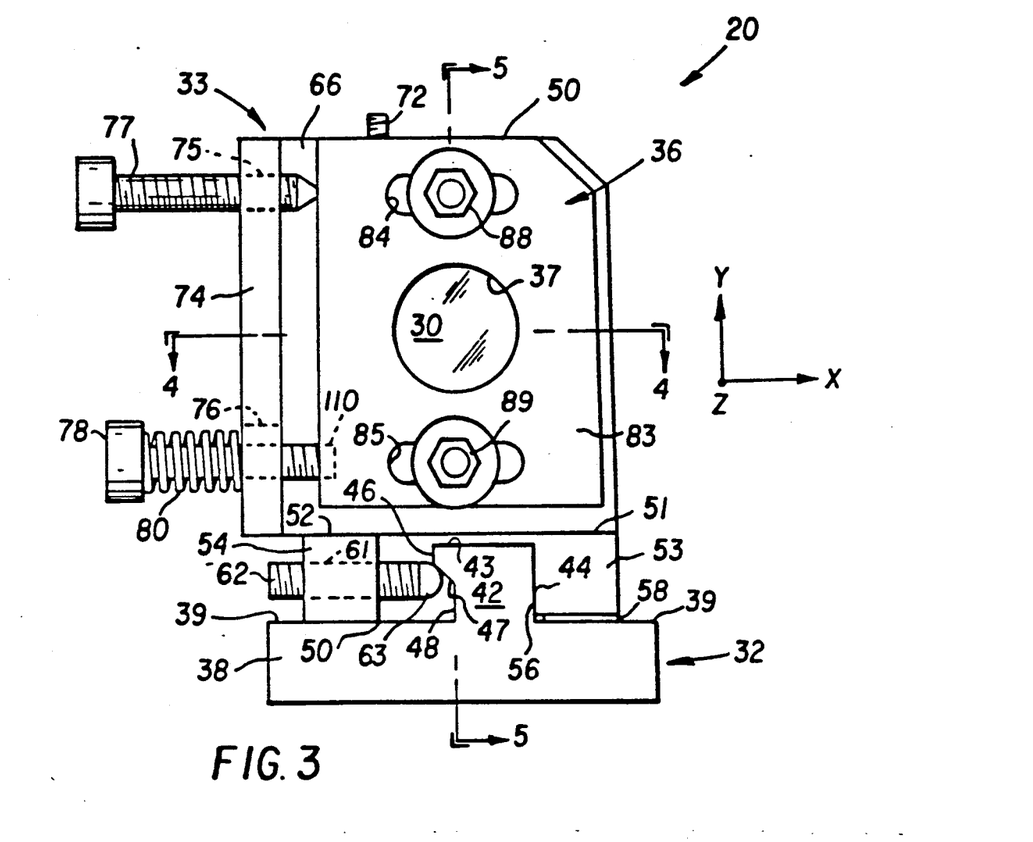
FIG. 3 is a front view of the mount of FIG. 2.

The mount 20 comprises three basic components: a base 32 elongated in the z axis direction, a lens carrier 33 including a central optical opening 34, and a lens retainer 36 including a corresponding opening 37. The base 32 (omitted for clarity from FIGS. 4 and 5) has a platform 38 which may be an integral part of a stationary structure that supports all of the components of the optical assembly. The platform 38 has a horizontal planar upper surface 39 and a rail 42 extending longitudinally in the z axis direction along the surface 39 (FIGS. 2 and 3). The rail 42 has a top surface 43, a vertical right side surface 44 extending between the surfaces 39 and 43, and a stepped left side surface 45. The surface 45 has an upper portion 46, an inwardly and downwardly directed angled portion 47 and a lower vertical portion 48. The base is machined so that surface 39 is parallel to the x-z plane and surface 44 is parallel to the y-z plane of the optical system. Rail 42 is formed to have a uniform lateral cross-section throughout its length.

Figure 4:
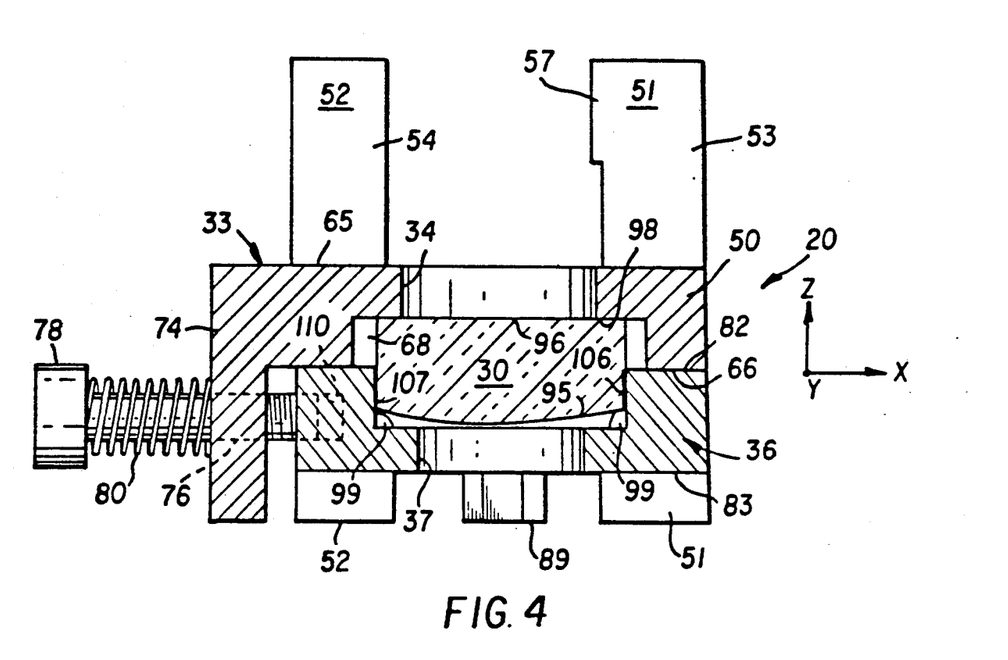
FIG. 4 is a horizontal section view taken along the line 4—4 of FIG. 3, with base omitted.
Figure 5:
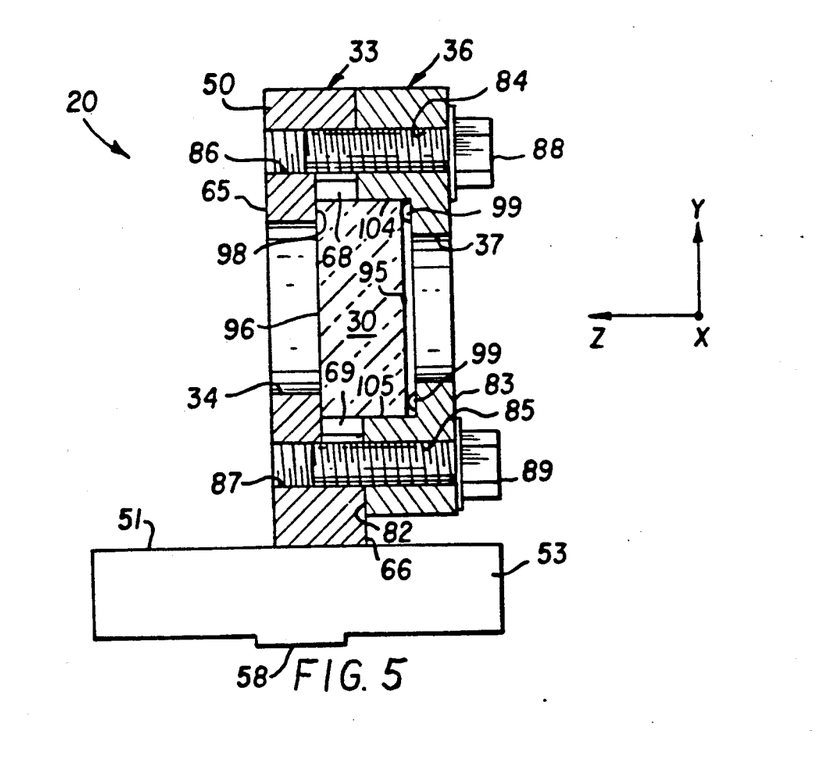
FIG. 5 is a vertical section view taken along the line 5—5 of FIG. 3, with base omitted.

The lens carrier 33 comprises a vertical rectangular portion 50 extending laterally between central points of attachment to upper surfaces 51, 52 of right and left, longitudinally extending pedestal members 53, 54. The member 53 has a rectangular lateral cross-section which is uniform, except for front and rear, leftwardly protruding rectangular pads 56 (FIGS. 2 and 3), 57 (FIG. 4) and a central downwardly protruding rectangular pad 58 (FIGS. 2, 3 and 5). The member 54 has a rectangular lateral cross-section which is likewise uniform, except for front and rear, downwardly protruding rectangular pads 59 (FIGS. 2 and 3). The undersurfaces of pads 58, 59 are planar horizontal surfaces, machined to be in the same plane parallel to the x-z plane of the optical system. The left surfaces of pads 56, 57 are planar vertical surfaces, machined to be in the same plane parallel to the y-z plane of the optical system. The left pedestal 54 includes a threaded bore 61 (dashed lines in FIG. 3), directed horizontally in the x axis direction laterally therethrough, through which a threaded adjustment screw 62 having a non-abrasive, spring-loaded plunger tip 63 is passed.

The vertical portion 50 has front and rear vertical surfaces 65, 66. A rectangular lens-receiving cavity 68 is formed in the rear surface 66 with horizontal and vertical dimensions slightly larger than the corresponding dimensions of the lens 30. Threaded bores 86, 87 extend in the z axis direction between surfaces 65, 66, in respective positions above and below the cavity 68. A locator pin or rib 69, whose function is described in greater detail below, is fixed in the lower edge surface of the cavity 68, proximate the right side, bottom corner. A threaded bore 71 (dashed lines in FIG. 2) extends vertically in the y axis direction through the top of portion 50 and opens into the upper edge surface of the cavity 68 adjacent the left side, upper corner thereof. A threaded adjustment screw 72 having a non-abrasive tip is received therein for selective advancement along the y axis direction into the cavity 68. The opening 34 is a circular opening formed concentrically parallel with the z axis.

The left side of the portion 50 includes a rectangular rearward extension 74 having upper and lower lateral bores 75, 76 (shown in dashed lines in FIG. 3) horizontally directed in the x axis direction, and through which threaded screws 77, 78 are passed. The bore 75 is threaded and sized to match the external threading on the shank of the screw 77. The tip of the screw 77 is made non-abrasive. The bore 76 (FIGS. 2-4), on the other hand, is made smooth and is elongated in the vertical y axis direction, with slight oversizing in the horizontal z axis direction. This permits free axial movement of the shank of screw 78 in the x axis direction and diagonal vertical tilting of the shank in the $\theta_z$ direction within the confines of bore 76. A compression spring 80 is located about the shank of the screw 78, between the left side of the extension 74 and the enlargement of the screw's head, to exert a leftwardly-directed force on the screw 78.

The lens retainer 36 is of block-like rectangular construction comprising front and rear planar vertical faces 82, 83 between which the opening 37 extends. The opening 37 is circular and formed concentrically parallel with the z axis. Bores 84, 85 also extend in the z axis direction between faces 82, 83, in respective positions above and below the opening 37. The bores 84, 85 are made smooth and elongated in the horizontal x axis direction, with slight oversizing in the y axis direction. The vertical spacing between bores 84, 85 matches the vertical spacing of the corresponding bores 86, 87 located above and below the opening 34 in the carrier 33. Screws 88, 89 are respectively passed through the bores 84, 85 and threaded into the bores 86, 87, bringing the surface 82 of retainer 36 into generally parallel alignment proximate the surface 66 of carrier 33. The threaded bores 86, 87 are sized to match the external threading of the shanks of screws 88, 89. The elongation of bores 84, 85 in the x axis direction permits movement of the retainer 36 relative to the carrier 33 in that direction, within the confines of movement of the screws 88, 89 within the bores 84, 85, when the screws 88, 89 are loosely engaged in bores 86, 87. The oversizing in the y axis direction permits limited $\theta_z$ movement of retainer 36 relative to carrier 33. When the screws 88, 89 are tightened down, further x axis or $\theta_z$ directional movement of retainer 36 relative to carrier 33 is prevented.

The lens 30 (see FIGS. 2, 3, 4, 5 and 6) has upper and lower horizontal x-z planar cut edges 91, 92 and left and right vertical y-z planar cut edges 93, 94. The particular lens 30, shown for illustrative purposes, is of a convex plano construction, having a convex rear surface 95 (FIGS. 4 and 5) and an x-y planar front surface 96 (FIGS. 4 and 5). The surface 95 is cylindrically contoured to provide curvature (i.e. magnification) in the x axis direction, but uniformity (i.e. no magnification) in the y axis direction. The contour of the convex surface 95 has a cylindrical curvature centered about a lens cylindrical axis 97 indicated in FIG. 2. The lens 30 acts to provide magnification in the x axis direction only, so can be used to control the x axis direction extent of the spot size of a laser elliptical scanning beam directed along the z axis toward the lens 30. Ideally, lens 30 is shaped so that the cylindrical axis 97 of surface 95 is coincident with the midpoints of the x axis extents of the edges 91, 92 and is parallel to the y-z planes of the edges 93, 94. However, most lenses are not ideal. The mount 20 has a purpose of assuring that the lens axis of cylindrical surface 95 will be precisely aligned with the incident optical beam in the y-z plane. Slight variations in translational alignment of lens 30 in the y axis (non-magnification) direction will have little effect, since magnification occurs in the x axis direction only. Alignment in the z axis direction affects focusing only and will be adequately accommodated. Of greatest concern, therefore, are adjustments in the x axis (magnification) translational and $\theta_z$ rotational directions. Positioning for $\theta_y$ and $\theta_x$ rotation can be accomplished by assuring that the front planar surface 96 (orthogonally cut relative to the edges 91, 92, and 93, 94) is in alignment with the x-y plane of the optical system. This is done by shaping a front surface 98 of cavity 68 to be vertically planar in the x-y plane.

As shown in FIGS. 2-5, the plano surface 96 of the cylindrical lens 30 is pressured in the z axis direction against the recessed x-y planar surface 98 of the cavity 68 of lens carrier 33. This positions the lens 30 in the $\theta x$ and $\theta y$ rotational directions sufficiently for laser printer beam shaping applications without the need for adjustment. The pressure is provided through resilient means, such as RTV or rubber members 99 (FIG. 4) placed in enlargements 100 at the corners of a forwardly-opening cavity 102 of retainer 36 (shown in dashed lines in FIG. 2), and sandwiched between the lens retainer 36 and lens 30. The force exerted by lock screws 88, 89 serves to tightly compress the resilient members 99 between the retainer 36 and the lens 30.

The front part of lens 30 is received within cavity 68 of carrier 33, with its plano surface 96 abutting the cavity surface 98. The back part of lens 30 is received within cavity 102 of retainer 36, with the corners of the convex surface 95 pressing against the resilient members 99. Cavity 102 is sized to match the x-y plane cross-sectional configuration of lens 30, with planar edge surfaces 104, 105, 106, 107 (FIGS. 2, 4 and 5) configured to match for close abutment purposes the corresponding lens surfaces 91, 92, 93, 94 of lens 30. Retainer 36 has a leftwardly-opening x-axis directed bore 110 (FIGS. 3 and 4), into which the right end of screw 78 is threaded. The right end tip of screw 77 presses against, but does not thread into, the left side of retainer 36. The heads of screws 62, 72 and 77 can be provided with allen wrench-receiving heads for ease of turning purposes.

Figure 6:
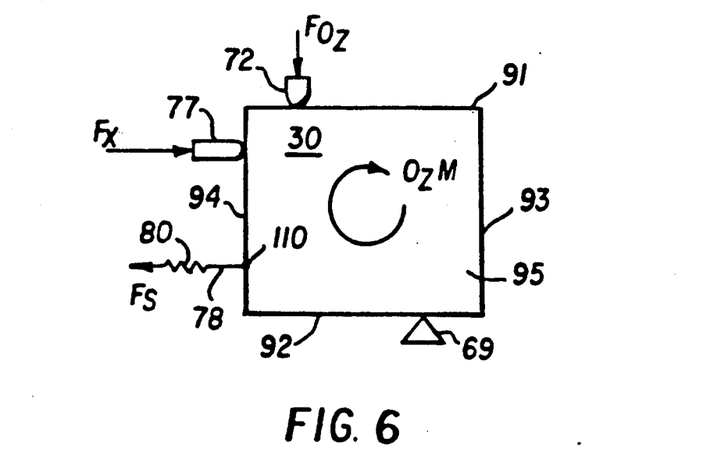
FIG. 6 is a schematic view helpful in understanding the operation of the mount of FIGS. 2-5.

In operation, as indicated in FIG. 6, a clockwise moment $\theta_z M$ is applied to the lens retainer 36 by the force $F_s$ of the spring 80 acting against the head of the screw 78, while the other end of the screw is attached at the bore 110 to the retainer 36. This provides a clockwise $\theta_z$ directed biasing torque on the lens 30 about a pivot point provided by the pin 69. The tip of screw 77 which is in contact with the left edge of the retainer 36 assists in this regard. The biasing torque forces the lens 30 also against the tip of screw 72 which, together with the tip of screw 77, supplies the forces $F_x$, $F_{\theta z}$, as indicated. Adjustment of the lens 30 in the x axis (magnification) translational and $\theta_z$ rotational directions may be made against the biasing force of spring 80 by advancing the screw 72 and/or 77. Advancing the screw 77 in the x axis direction will move the retainer 36 and lens 30 in the x axis direction to set the x position of the lens 30, acting in a push-pull manner with the spring 80. Advancing the screw 72 in the y axis direction will move the retainer 36 and lens 30 in a counterclockwise direction about the pivot point 69, to set the $\theta_z$ position against the biasing torque of spring 80. Adjustment of the angular positioning of lens 30 is accomplished first, so that the x axis adjustment is not affected thereby. The push-pull mechanism serves to maintain the $\theta_z$ adjustment, while the x axis adjustment is made. Once the x axis and $\theta_z$ positions have both been set, the screws 88, 89 are tightened down to lock the relative positions of the retainer 36 and carrier 33. A clockwise moment is chosen to load the lens 30 against the locators 72, 77, so that standard right-hand threaded lockdown screws 88, 89 will not dislodge the lens 30 from its adjusted position during lockdown. Because the lens retainer 36 does not itself function to locate the lens, but only to apply a pressure in the z axis direction and a $\theta_z$ biasing torque, it can be an inexpensive non-precision part. The only parts requiring precision are the lens 30, the lens carrier 33 and the base 32.

The lens carrier 33 is provided with three horizontally planar locating pads 58, 59 on its bottom and two vertically planar pads 56, 57 on its side, as previously described. The spring-loaded plunger 63 of screw 62 provides a force which loads all five pads against corresponding features of the base 32, which are elongated in the z axis direction to allow for adjustment in that direction. The features are arranged so that the surfaces 39, 44 critical to positioning can be machined with the same milling bit in the same setup, thus improving accuracy. The x-z planar pads 58, 59 are loaded against the x-z planar horizontal base surface 39 and the y-z planar pads 56, 57 are loaded against the y-z planar vertical rail surface 44. The rail 42 is dimensioned so that its top surface 43 is not in contact with the carrier 33. Loading is accomplished by applying the spring force of the plunger end 63 of the screw 62 against the diagonal angling of the surface 47, thereby providing both x and y axis direction force components. To move the carrier 33 in the z axis direction for focusing, screw 62 is loosened to let the carrier 33 slide along the rail 42 until its desired z axis position is attained, then tightened to lock the carrier 33 in that position. The spring of plunger 63 keeps the pads loaded against the rail during such adjustment. Assuring that the surface 98 of cavity 68 is machined to be planar in the x-y plane, perpendicular to the respective x-z and y-z planar surfaces of the pads 58, 59 and pads 56, 57, assures the proper location of the lens 30 in the $\theta_x$, $\theta_y$ rotational directions when the plano lens surface 96 is pressed against the surface 98.

Figure 7:
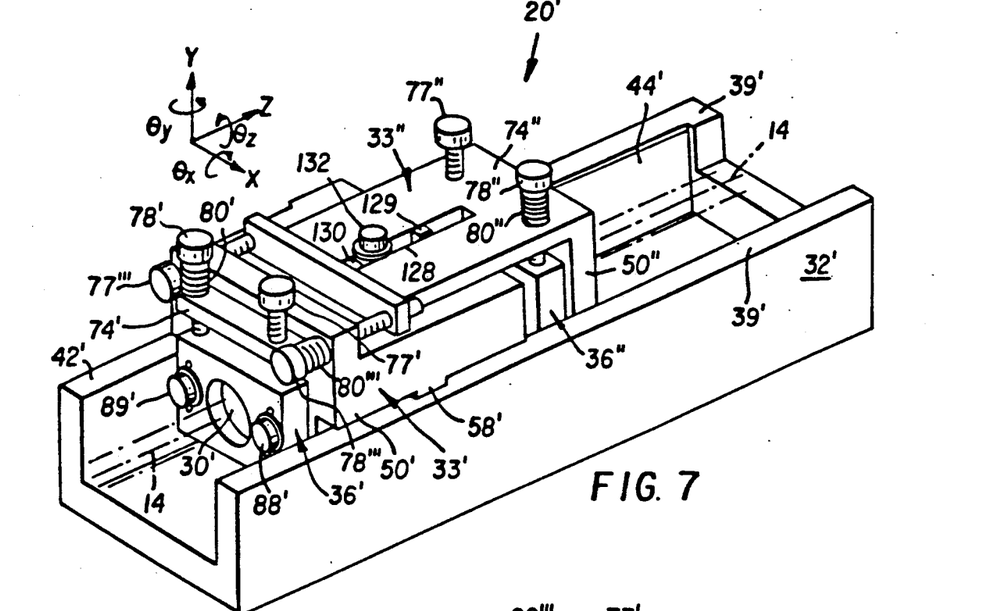
FIGS. 7 and 8 are perspective views, looking downstream and upstream, respectively, of another cylindrical lens mount of FIG. 1.
Figure 8:
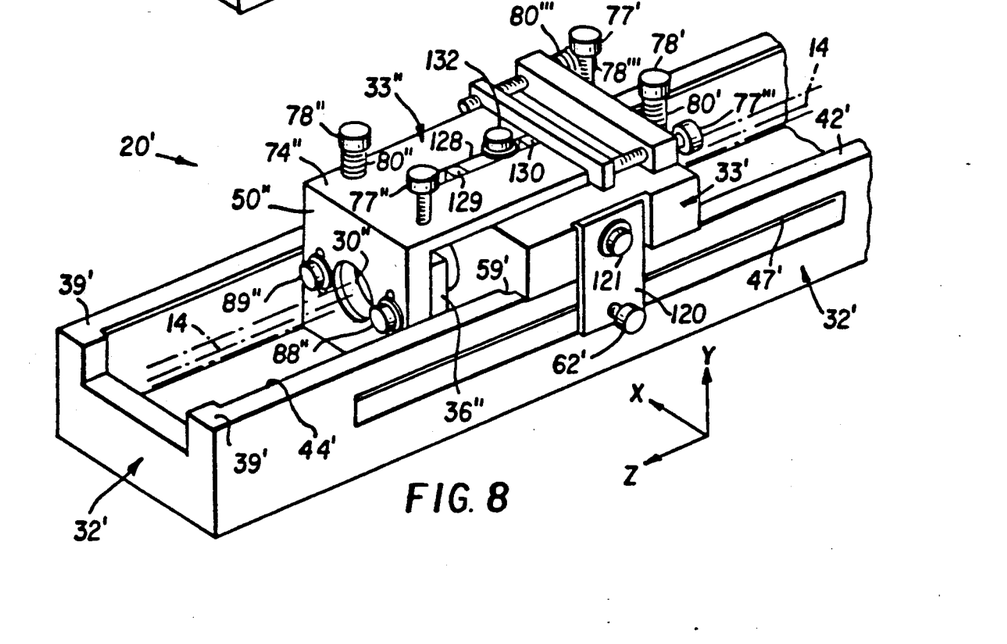

FIGS. 7 and 8 illustrate the same principles discussed above, applied in the lens mount 20' of FIG. 1. The mount 20' makes provision for mounting two cylindrical lenses 30', 30", both of which are set with their magnifications (i.e. curvatures) in the y axis direction. As shown, one lens 30' is mounted in the cavities of a retainer 36' and a carrier 33'. Screw 77' passes through an extension 74' of carrier 33' to press against an edge of retainer 36', and screw 78' attaches by threading engagement with retainer 36' at another location of the same edge and is biased by the action of a spring 80'. A similar setup is provided for the lens 30" placed with different parts thereof in the cavities of carrier 33" and retainer 36". A screw 77" passes through an extension 74" to press against the retainer 36", and a screw 78" attaches to retainer 36" to provide biasing under the action of spring 80". Screws 88', 89' and 88", 89" provide locking in the same manner as the screws 88, 89, discussed above.

Z axis positioning of the lens 30' is provided by five point loading of three horizontally planar pads 58', 59' and two vertically planar pads (not shown) of carrier 33' against corresponding horizontally and vertically planar surfaces 39', 44' of base 32'. A depending arm 120 (FIG. 8), which attaches at a screw 121 to a side of the carrier 33', a screw 62' with a spring-loaded plunger end which presses against an angled surface 47' of a longitudinal recess in a rail portion 42' of the base 32'. The plunger end of screw 62' acting on surface 47' draws the horizontal pads 58', 59' down against the horizontal surfaces 39', and the vertical pads (not shown) out carrier 33'. Provision for relative z axis directional movement of carrier 33" relative to carrier 33' is provided by screws 77''', 78''' which establish a push-pull mechanism between the members 33' and 33". Longitudinally-spaced projections 129, 130 of member 33' extend upward for travel within a longitudinal slot 128 formed within carrier 33". Slot 128 is slightly larger than the projections 129, 130 in the x axis direction. A counterclockwise push-pull $\theta_y$ biasing torque established by the force of spring 80''', loads opposite sides of the projections 129, 130 against opposite sides of the slot 128. A lockdown screw 132 locks the established relative z axis directional position of the carriers 33', 33" after adjustment.

Those skilled in the art to which the invention relates will appreciate that other substitutions and modifications can be made to the described embodiments without departing from the spirit and scope of the invention as described by the claims below.

I claim:

1. A device for positioning a cylindrical lens or the like translationally with respect to x, y, z orthogonal axes directions and rotationally with respect to $\theta_x$, $\theta_y$, $\theta_z$ directions respectively dangularly about said x, y, z axes directions in an optical system having a source for projecting a beam of light along a path in said z axis direction, onto said lens positioned by said device, and onto a receiving medium; said lens including a curved cylindrical surface for providing magnification in one of said x and y axes directions; said device including means for angularly positioning said lens relative to said $\theta_x$ and $\theta_y$ directions; means for translationally positioning said lens relative to said other of said x and y axes directions; means for translationally positioning said lens relative to said z axis direction; measn for adjustably translationally positioning said lens relative to said one of said x and y directions; and measn for adjustably angularly positioning said lens relative to said $\theta_z$ direction; said device being characterized in that:
said device further comprises means for applying a biasing torque on said lens in said $\theta_z$ direction; and said means for adjustably angularly positioning said lens relative to said $\theta_z$ direction comprises means for moving said lens rotationally in said $\theta_z$ direction against said biasing torque applied on said lens by said biasing torque means;

wherein said device further comprises a lens carrier having a first cavity for receiving a portion of said lens; and a lens retainer having a second cavity, axially-spaced in said z axis direction from said first cavity, for receiving a different portion of said lens; and wherein said means for applying a biasing torque on said lens in said $\theta_z$ direction comprises means for applying a biasing torque on one of said lens carrier and retainer relative to the other of said lens carrier and retainer.

2. A device as in claim 1, wherein said means for positioning said lens relative to said $\theta_z$ direction comprises a protuberance projecting into said cavity of said other of said lens carrier and retainer, and means for moving said lens pivotally about said protuberance against the biasing torque applied to said one of said lens carrier and retainer.

3. A device as in claim 2, wherein said means for applying a biasing torque to said one of said lens carrier and retainer comprises a first member attached to said one of said lens carrier and retainer; and means movably mounting said first member on said other of said lens carrier and retainer for biasing said first member about said protuberance relative to said other of said lens carrier and retainer.

4. A device for positioning a cylindrical lens or the like translationally with respect to x, y, z orthogonal axes directions sand rotationally with respect to $\theta_x$, $\theta_y$, $\theta_z$ directions respectively angularly about said x, y, z axes directions in an optical system having a source for projecting a beam of light along a path in said z axis direction, onto said lens positioned by said device, and onto a receiving medium; said lens including a curved cylindrical surface for providing magnification in one of said x and y axes directions; said device including means for angularly positioning said lens relative to said $\theta_x$ and $\theta_y$ directions; measn for translationally positioning said lens relative to said other of said x and y axes directions; means for adjustably translationally positioning said lens relative to said z axis direction; means for adjustably translationally positioning said lens relative to said one of said x and y directions; and means for adjustably angularly positioning said lens relative to said $\theta_z$ direction; said device being characterized in that:

said device further comprises a lens carrier having a first cavity for receiving a portion of said lens; a lens retainer having a second cavity, axially-spaced in said z axis direction from said first cavity, for receiving a different portion of said lens; and means, applying a biasing torque on one of said lens carrier and retainer relative to the other of said lens carrier and retainer, for applying a biasing torque on said lens in said $\theta_z$ direction;

said means for adjustably angularly positioning said lens relative to said $\theta_z$ direction comprises a protuberance projecting into said cavity of said other of said lens carrier and retainer, and measn for moving said lens pivotally about said protuberance against the biasing torque applied to said one of said lens carrier and retainer;

said means for applying a biasing torque to said one of said lens carrier and retainer comprises a first member attached to said one of said lens carrier and retainer; and means movably mounting said first member on said other of said lens carrier and retainer for biasing said first member about said protuberance relative to said other of said lens carrier and retainer; and said means for adjustably translationally positionally said lens relative to said one of said x and y directions comprises a second member attached to said other of said lens carrier and retainer; means mounting said lens carrier and retainer in axially-shaped relationship in said z axis direction; and means for advancing said second member in said one of said x and y directions against said one of said lens carrier and retainer.

5. A device as in claim 4, wherein said means for translationally positioning said lens relative to said z axis direction comprises said device further having a base, including a rail extending in said z axis direction, and said other of said lens carrier and retainer further includes means for locking said other of said lens carrier and retainer in a z axis direction position along said rail.

6. A device as in claim 5, wherein said rail includes an inwardly directed surface extending in said z axis direction, and said locking means comprises an element mounted on said other of said lens carrier and retainer, and means for moving said mounted element into locking engagement against said inwardly directed surface.

7. A device as in claim 1, wherein said lens carrier first cavity has x and y axis direction dimensions larger than corresponding x and y axis direction dimensions of said lens, for receiving said portion of said lens; said lens retainer second cavity has x and y axis direction dimensions slightly larger than the corresponding x and y dimensions of said lens, for receiving said different portion of said lens; said device further comprises means mounting said lens retainer in z axis axially displaced position relative to said lens carrier; and wherein said biasing torque is applied on said lens retainer.

8. A device as in claim 7, wherein said measn for positioning said lens relative to said $\theta_z$ direction comprises a protuberance formed in a wall of said first cavity, and means movably mounted on said lens carrier and projecting into said first cavity for moving said lens pivotally about said protuberance against the biasing torque applied to said lens retainer.

9. A device for positioning a cylindrical lens or the like translationally with respect to x, y, z orthogonal axes directions and rotationally with respect to $\theta_x$, $\theta_y$, $\theta_z$ directions respectively angularly about said x, y, z axes directions in an optical system having a source for projecting a beam of light along a path in said z axis direction, onto said lens positioned by said device, and onto a receiving medium; said lens including a curved cylindrical surface for providing magnification in one of said x and y axes directions; said device including means for angularly positioning said lens relative to said $\theta_x$ and $\theta_y$ directions; means for transitionally positioning said lens relative to said other of said x and y axes directions; means for adjustably translationally positioning said lens relative to said z axis direction; means for adjustably translationally positioning said lens relative to said one of said x and y directions; and means for adjustably angularly positioning said lens relative to said $\theta_z$ directions; said device being characterized in that;

said device further comprises a lens carrier formed with a first cavity, having x and y axis direction dimensions larger than the corresponding x and y axis direction dimensions of said lens, for receiving a first portion of said lens; a lens retainer formed with a second cavity, having x and y axis direction dimensions slightly larger than the corresponding x and y dimensions of said lens, for receiving a second portion of said lens opposite said first portion; means mounting said lens retainer in z axis axially displaced position relative to said lens carrier; and means, applying a biasing torque in said $\theta_z$ direction on said lens retainer relative to said lens carrier, for applying a biasing torque on said lens in said $\theta_z$ direction;

said means for adjustably angularly positioning said lens relative to sd $\theta_z$ direction comprises a protuberance formed in a wall of said first cavity, and means movably mounted on said lens carrier and projecting into said first cavity for moving said lens pivotally about said protuberance against the biasing torque applied to said lens retainer; and said lens carrier includes a portion extending axially in the z axis direction alongside said lens retainer including a bore directed transversely to said z axis direction, and said means for applying a biasing torque to said lens retainer comprises a first longitudinal member having one end attached to said lens carrier, another end movably attached to said lens retainer through said bore, and means biasing said one end toward said extending portion.

10. A device as in claim 9, wherein said extending portion includes a second bore directed in said one of said x and y directions, and said measn for adjustably positioning said means relative to said one of said x and y directions comprises a second longitudinal member having one end fixed for selected adjustably positioning within said second bore, and another end located to contact said lens retainer to shift said retainer in said one of said, x and y directions.

11. A device as in claim 10, wherein said means for locking said lens retainer in z axis axially displaced position relative to said lens carrier comprises a first pair of z axis axially directed bores formed in said lens retainer, said first pair of bores being elongated in said one of said x and y directions; a second corresponding pair of z axis axially-directed bores formed in said lens carrier, and a pair of z axis axially-directed longitudinal fasteners passing through respective corresponding ones of said first and second pair of bores for releasably securing said lens retainer in locked position proximate said lens carrier., 12. A device as in claim 11, for positioning a cylindrical lens having a planar surface opposite said curved surface; and wherein said means for angularly positioning said lens relative to said $\theta_x$ and $\theta_y$ directions comprises said first cavity being formed with a planar inside surface against which said lens planar surface can be positioned; and means orienting said first cavity planar surface perpendicular to said z axis direction.

13. A device as in claim 12, wherein said means for positioning said lens in said z axis direction comprises said device having a base and a rail extending in said z axis direction, and means for locking said lens carrier in a selected z axis direction position along said rail.

14. A device as in claim 13, wherein said means orienting said first cavity planar surface comprises said lens carrier having a planar surface oriented parallel to said z axis direction, said planar inside surface being oriented at right angles to said z axis oriented planar surface, and said base including a complementary planar surface oriented parallel to said z axis direction and against which said lens carrier z axis oriented planar surface abuts.

* * * * *